Nov. 24, 1942.  E. B. SYMONS  2,302,723
JAW CRUSHER
Filed Feb. 17, 1939  9 Sheets-Sheet 1

Inventor
Edgar B. Symons
by Parker & Carter
Attorneys.

DISCHARGE PER REVOLUTION-
SHADED AREA =
.5 X 1 = .5 SQUARE INCH.

SHADED AREA =
$\frac{1}{2} \times 4\frac{1}{2}$ = 2.25 SQUARE INCHES

Nov. 24, 1942.  E. B. SYMONS  2,302,723
JAW CRUSHER
Filed Feb. 17, 1939  9 Sheets-Sheet 8

Inventor
Edgar B. Symons
by Parker & Carter
Attorneys

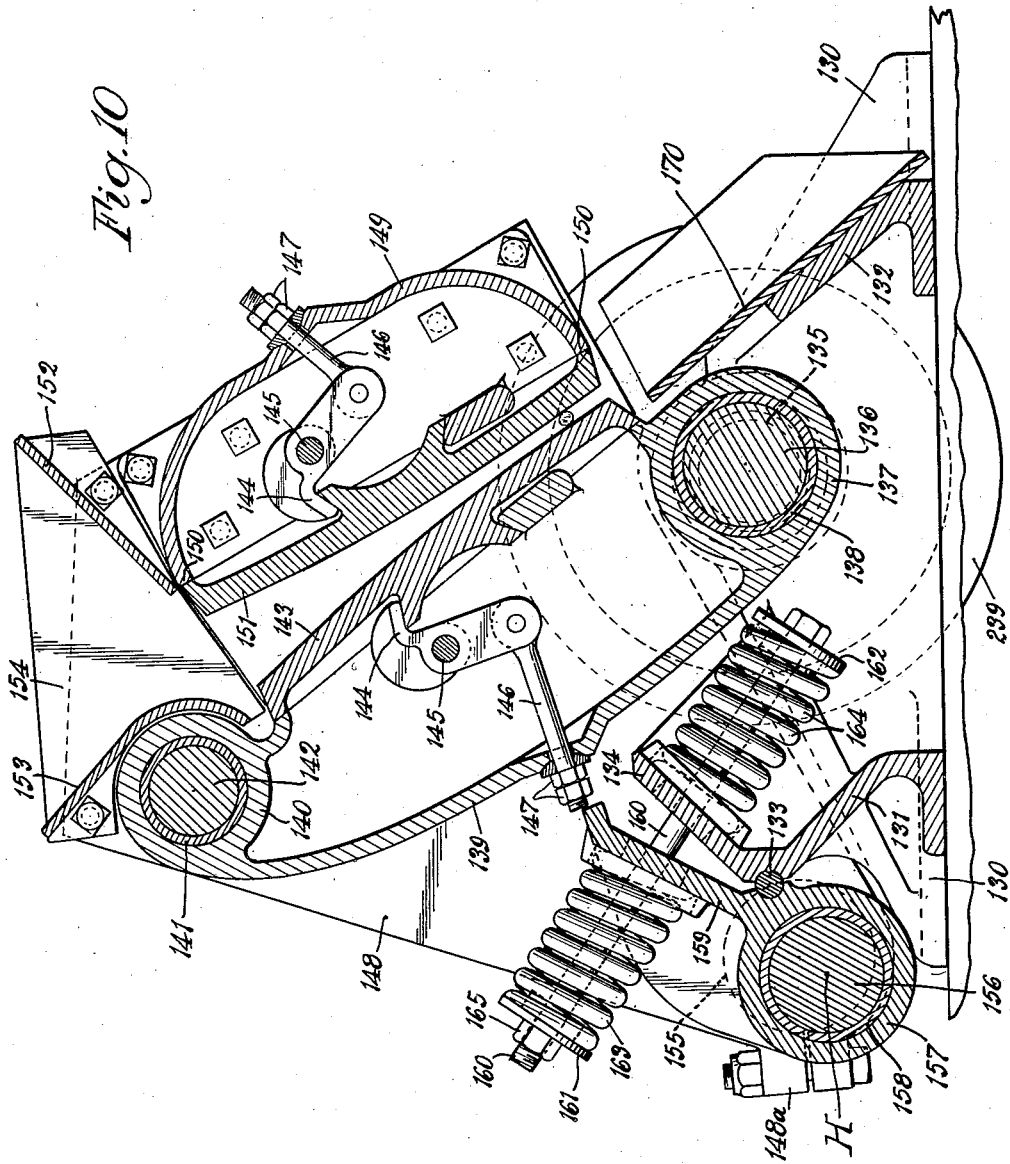

Patented Nov. 24, 1942

2,302,723

UNITED STATES PATENT OFFICE 2,302,723

JAW CRUSHER

Edgar B. Symons, Hollywood, Calif., assignor to Nordberg Manufacturing Company, Milwaukee, Wis., a corporation of Wisconsin Application February 17, 1939, Serial No. 256,911

25 Claims. (Cl. 83—53)

My invention relates to an improvement in jaw crushers and has for one purpose the provision of a jaw crusher which shall be efficient in its operation and high in its capacity.

Another purpose is the provision of improved release means for permitting the opposed jaws to separate in response to a predetermined excess crushing stress within the crushing cavity.

Another purpose is the provision of an improved feeding means.

Another purpose is the provision of an improved jaw crushing method wherein the material being crushed is positively conveyed through the crushing cavity by the action of the crushing jaws.

Another purpose is the provision of improved means for mounting the crushing jaws in relation to each other and to the frame.

Other purposes will appear from time to time in the course of the specification and claims.

I illustrate my invention more or less diagrammatically in the accompanying drawings wherein:

Fig. 10 illustrates the structure of Fig. 9 in a different position.

Like parts are indicated by like characters throughout the specification and drawings.

Figure 1:
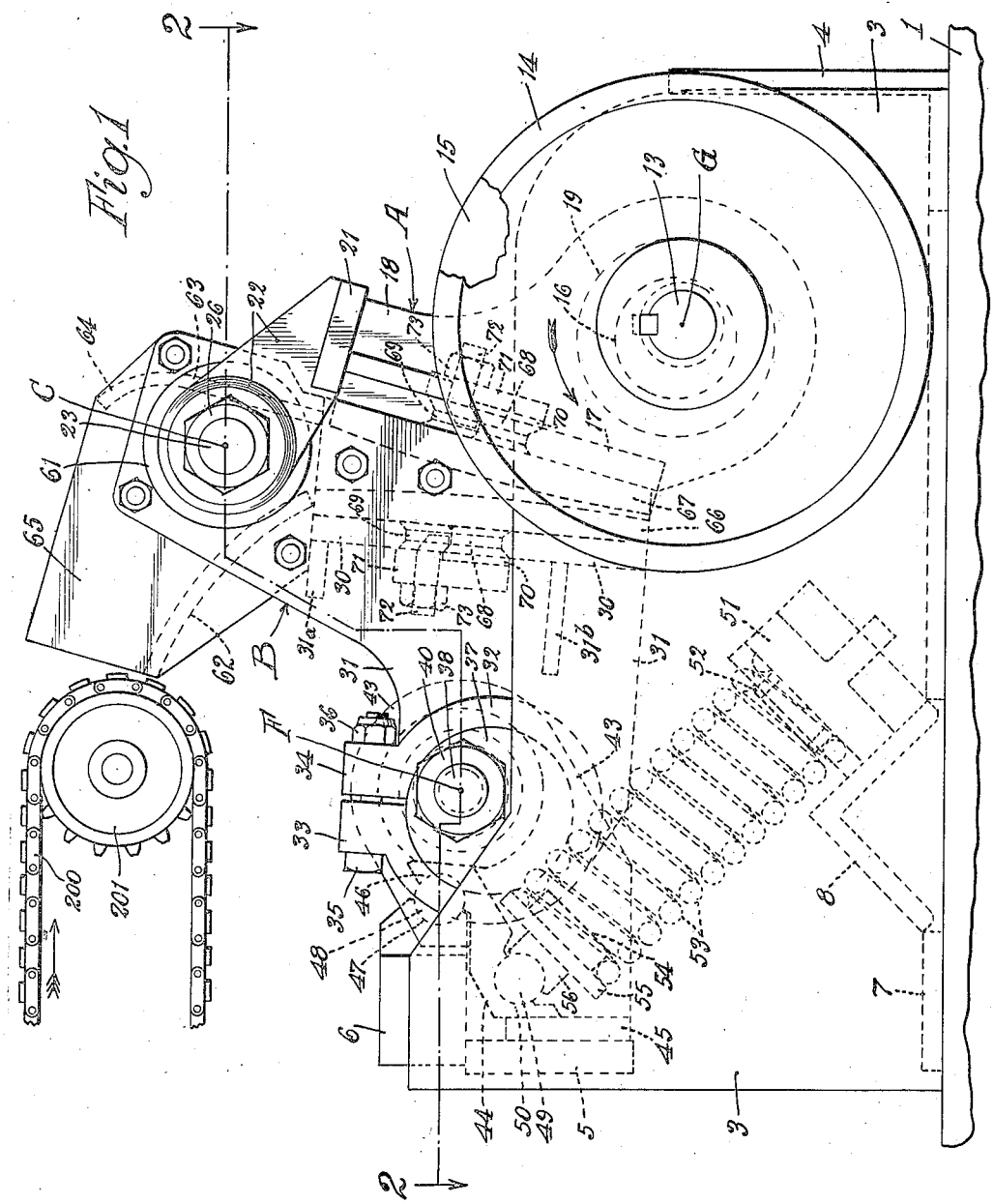
Fig. 1 is a side elevation.

Referring to the drawings, 1, 1 indicate portions of the foundation having between them an opening 2 down which the crushed material may pass by gravity. 3, 3 are side frame members which may be connected, for example by an end member 4 at one end and an upper end member 5 at the opposite end. 6 indicates a cross member adjacent the cross member 5, and 7, 8 are additional cross members whereby the side members 3 are secured together. It will be understood, of course, that the details of the frame may be varied. I illustrate the parts as welded but other securing means may be employed, or a unitary casting might be used.

Mounted in each side frame member 3 in an appropriate aperture is a sleeve member 9 having an outer flange 10 which may be secured to the frame member 3 by any suitable bolts 11. Any suitable bearing means 12 are mounted within the sleeves 9 to receive the shaft generally indicated as 13. The shaft is shown with a pulley 14 at one end and counterbalanced fly wheels 15 at each end. 16 indicate eccentric bearing portions formed in the intermediate part of the shaft 13, the purpose of which will later appear.

Figure 4:
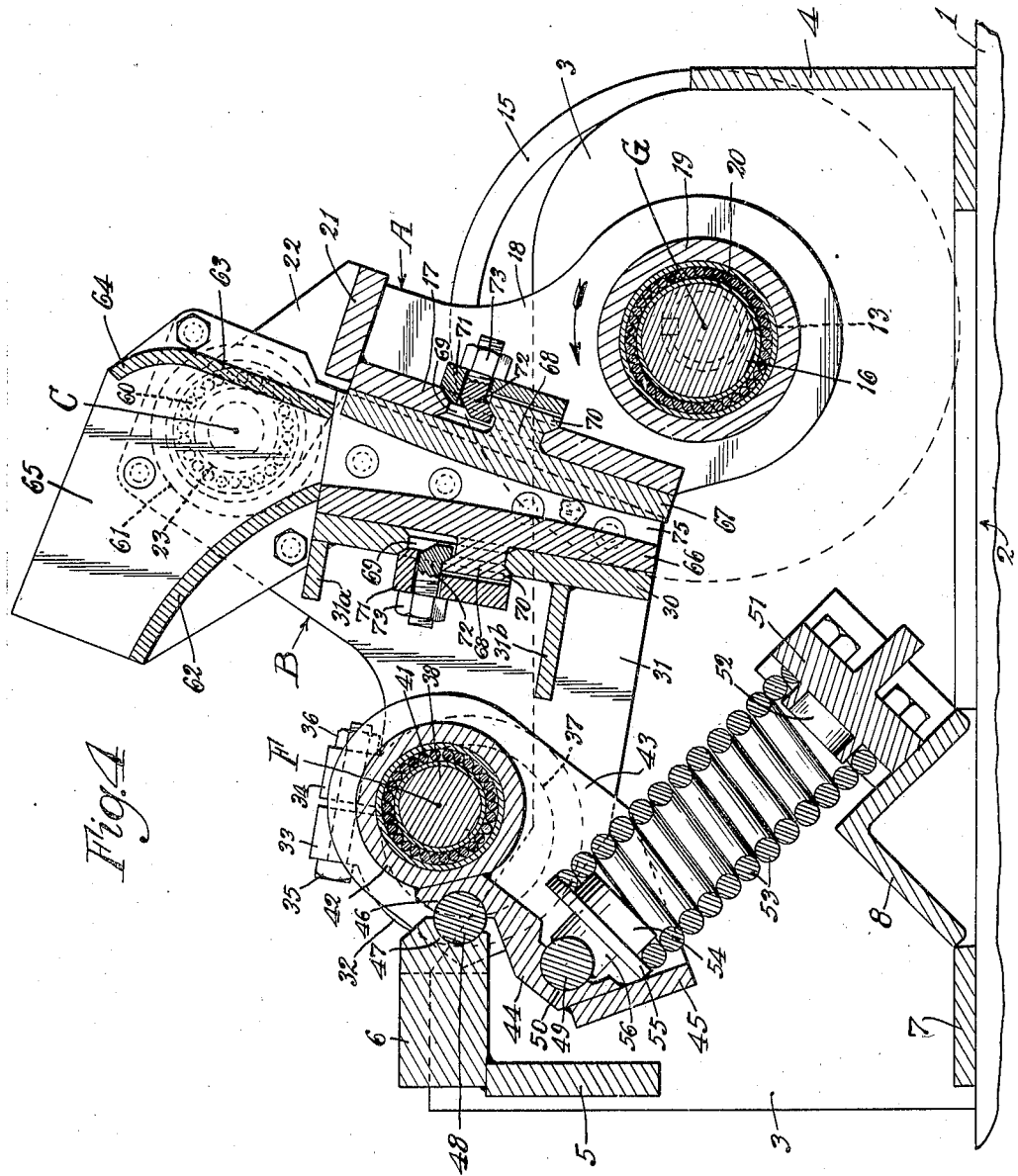
Fig. 4 is a section on the line 4—4 of Fig. 3, with the crushing members in a different position.

Referring to the jaw structure as shown for example in Figs. 1 and 4, I illustrate the jaws generally by the letters A and B, respectively. The jaw assembly A includes a forward jaw plate 17 with which are associated two downwardly extending arms 18, which in turn are secured to a sleeve 19 surrounding the portions 16 of the shaft 13. 20, 20 indicates any suitable anti-frictional bearings between the eccentric shaft portions 16 and the sleeve 19. It will be understood that in response to rotation of the shaft 13 an oscillation is thereby imparted to the jaw structure A.

21 indicates a transversely extending reinforcing or structural member for the jaw structure, it being secured to the upper edge of the jaw plate 17 and to the upper ends of the arms 18. This plate 21 carries forwardly extending members 22 at each end thereof which carry coaxial stub shafts 23, the stub shafts being tapered as at 24 and seated in corresponding apertures 25 in the members 22. The shafts are locked in position for example by any suitable nuts 26.

The jaw structure B includes a jaw plate 30 corresponding to the above mentioned jaw plate 17 of the jaw A. Rearwardly extending webs 31 are connected thereto and are further connected for example by transverse members 31a and 31b. The members 31 each have associated therewith a split ring structure including the portion 32 with opposed ears 33, 34 through which may pass any suitable bolt 35 with its locking nut 36. Preferably but not necessarily the split ring structure is unitary with the member 31.

Located within the sleeve formed by each split ring is a disc 37 in which is eccentrically mounted a shaft 38 which connects the two members 37. The shaft 38 has at each end a tapered portion 39 seated in a correspondingly formed aperture in the members 37. Any suitable locking nuts 40 may be employed.

Surrounding the shaft 38 are a plurality of antifrictional bearings 41 which in turn are surrounded by a sleeve 42 which is provided with side plates 43 between which extend cross members 44, 45. The cross member 44 is recessed as at 46 and the opposed member 6 of the frame is correspondingly recessed as at 47, the two recesses partially surrounding and conforming to a pivot rod 48 which is thereby clamped between the opposed members 6 and 44. Another pivot rod 49 is similarly recessed as at 50 in a lower portion of the member 44 and at the opposite side thereof.

Figure 2:
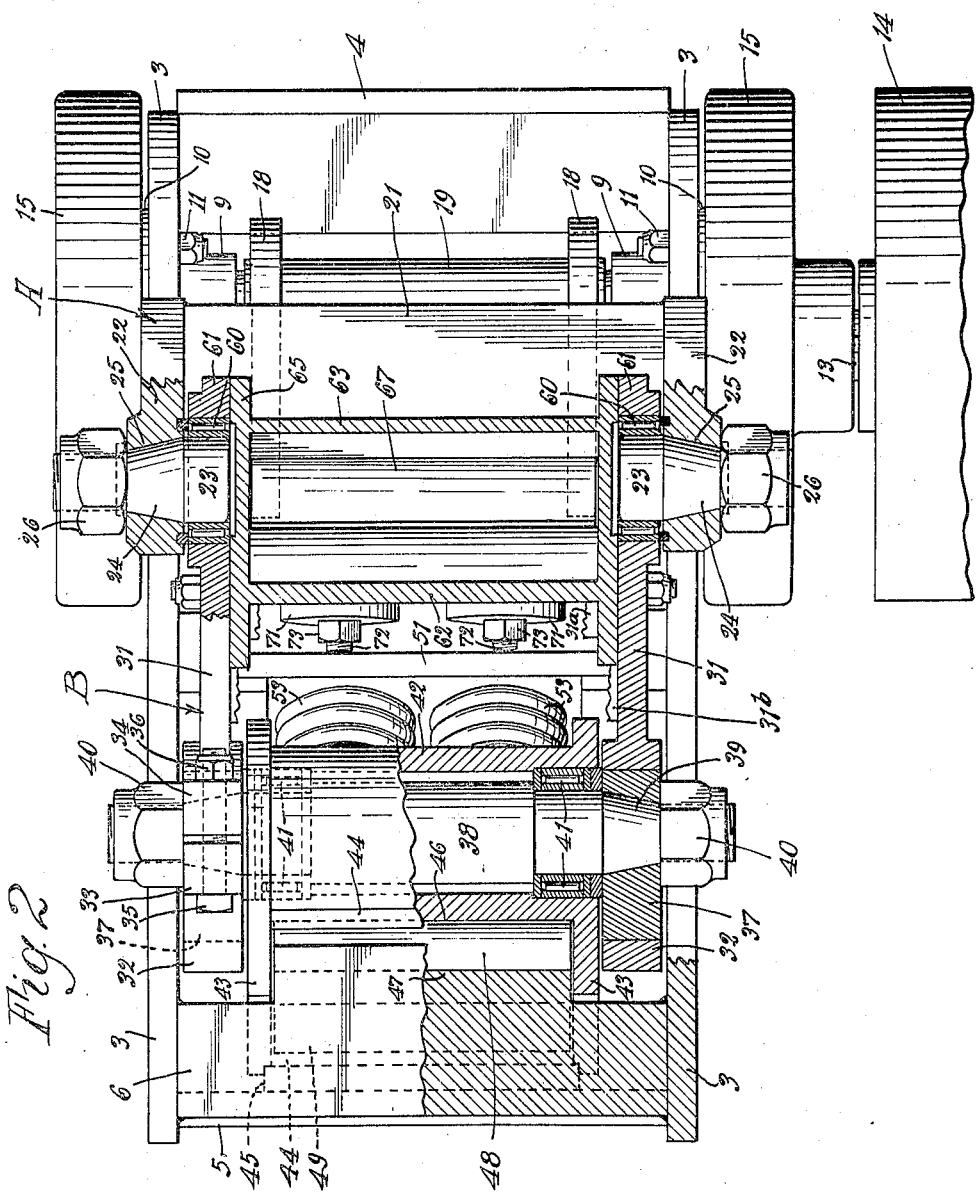
Fig. 2 is a section on the line 2—2 of Fig. 1.
Figure 3:
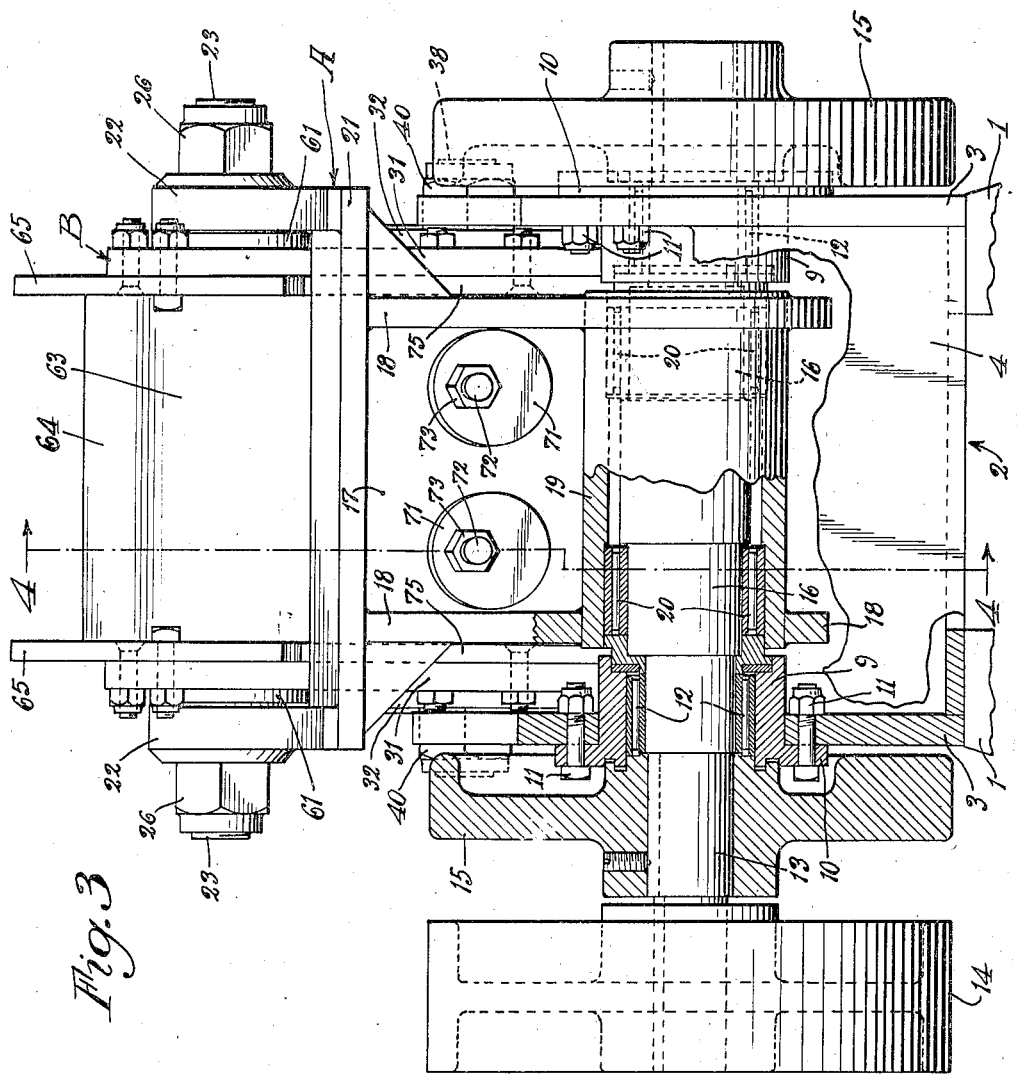
Fig. 3 is an end elevation with parts broken away and parts in section.

51 is any suitable spring abutment secured to the transversely extending frame angle 8 which is provided with a centering member 52 which receives a compressed coil spring 53, the upper end of which surrounds a similar centering abutment 54 on a plate or other suitable member 55 which, in turn, by means of the member 56, is secured to the pivot rod 49. It will be understood that any appropriate number of springs 53 may be employed, with their corresponding abutments, but I illustrate two such springs in Fig. 2.

The jaw structures A and B are pivoted adjacent their upper ends. I illustrate, for example, surrounding the stub shafts 23 on the jaw structure A, anti-frictional bearings 60, each of which is surrounded by a sleeve 61 which is mounted on or forms part of the side jaw member 31 of the jaw structure B. It will be observed that the side plates or jaw members 31 of the jaw B, as shown for example in Fig. 1, extend across the sides of the crushing cavity formed by the opposed jaw structures A and B.

A feed member may if desired be mounted on the jaw structure B. I illustrate for example transversely extending feed guide plates 62 and 63, the plate 63 having something of an overhang as at 64. Associated with them are any suitable side plates 65. The feed member so formed oscillates with the jaw B and delivers material to the crushing cavity.

In order to define the crushing cavity and provide wear taking members therefor, I illustrate opposed removable jaw liners 66, 67. Each of these is shown as provided with a rearwardly extending lug or lugs 68 which pass through apertures 69 in the jaw plates 17 and 30, respectively. 70 indicates an enlargement on each such lug and the parts are so formed that when the jaws are in the position in which they are shown in Fig. 4, the enlargement 70 overhangs the lower wall of the aperture 69.

Any suitable means for wedging or holding the liners in position may be employed. I illustrate for example locking plates 71 overlying the apertures 69 in which may be mounted upset locking bolts 72 with the nuts 73. It will be realized, however, that any other suitable means for locking the liners in position may be employed. I may also employ removable side liners for the jaw cavity, illustrated for example at 75, which may be removably secured to the inner faces of the side jaw members 31.

Figure 7:
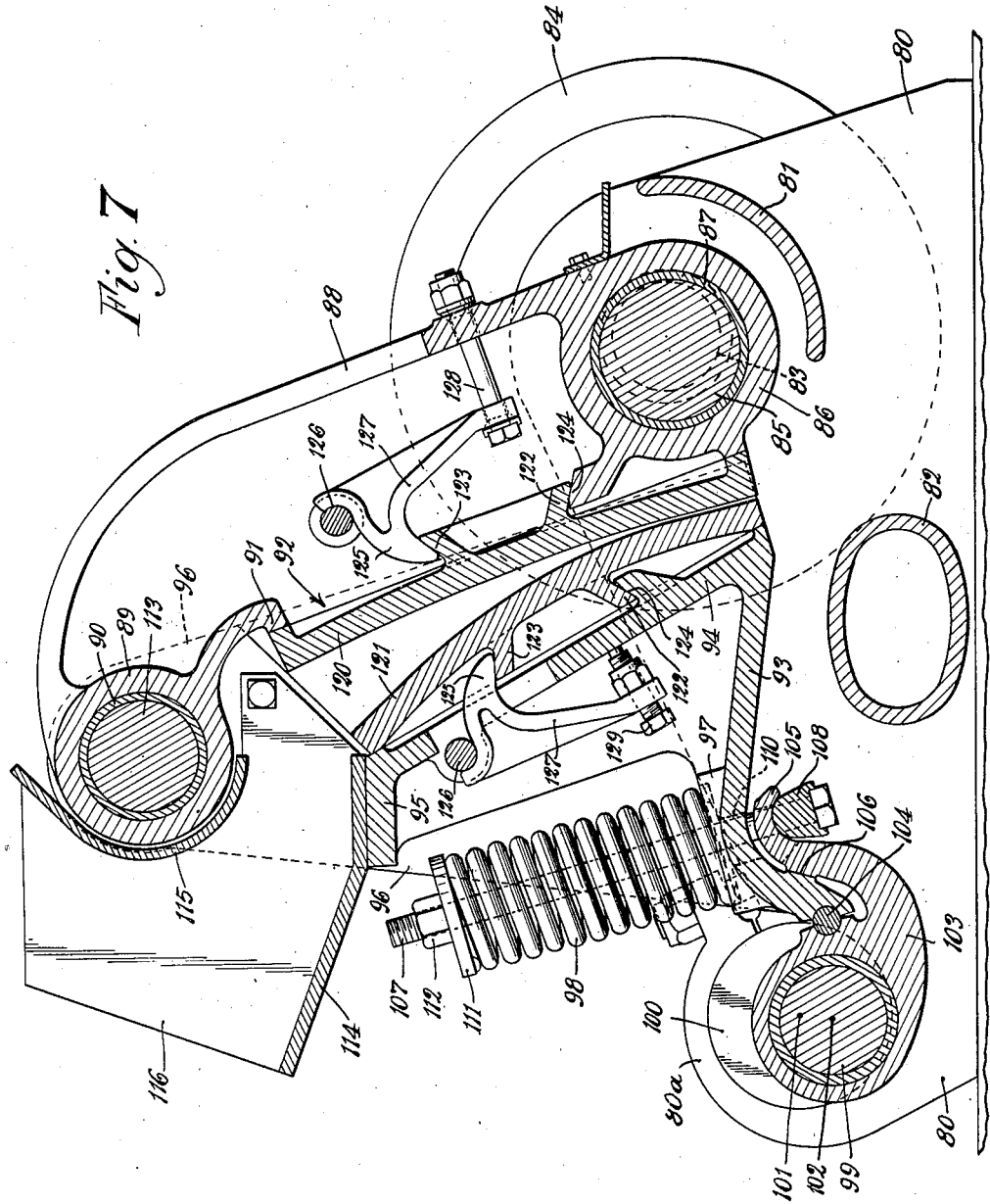
Fig. 7 is a section through a variant form of my device.
Figure 8:
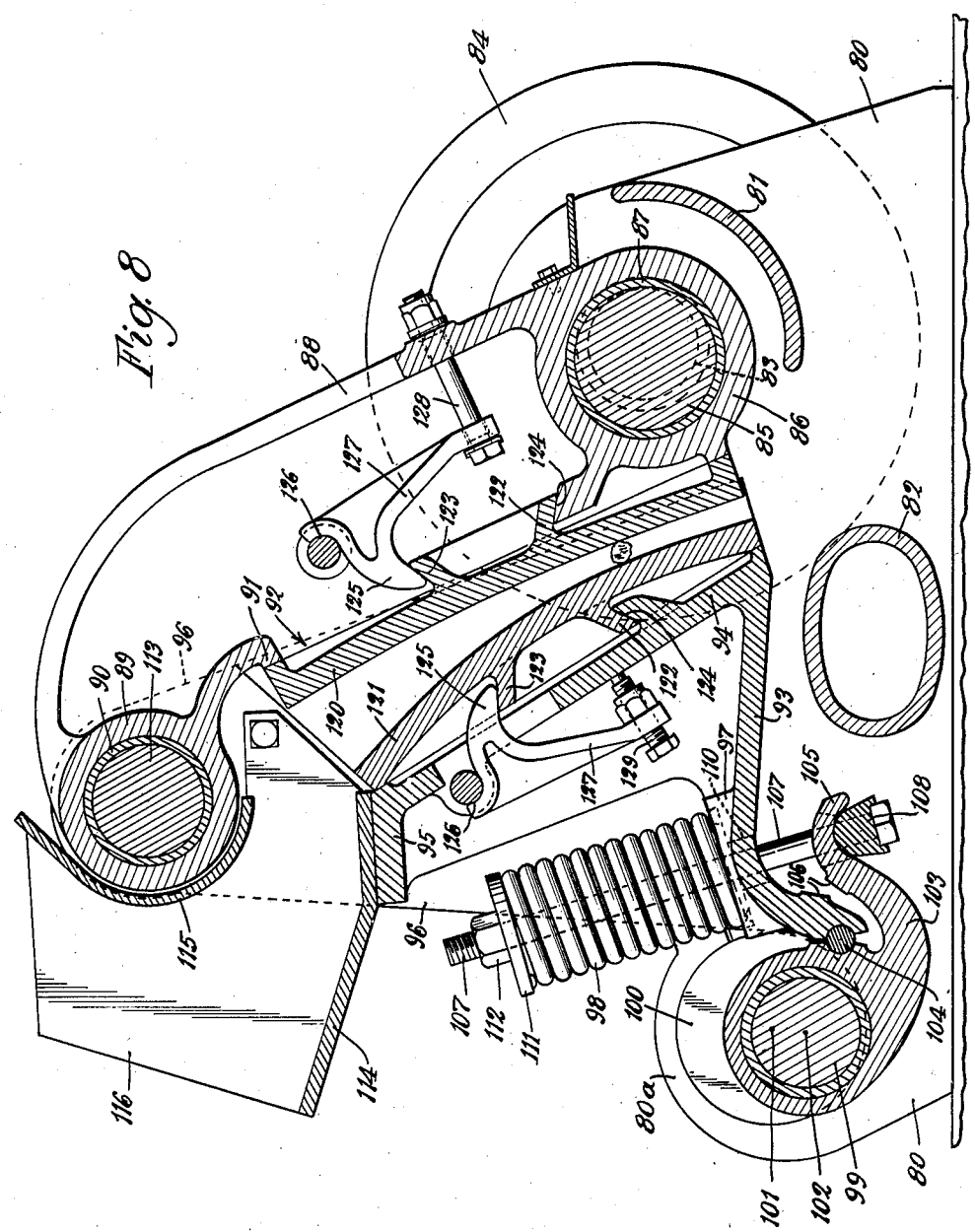
Fig. 8 illustrates the same structure in a different position.

Referring to the form of Figs. 7 and 8, any suitable base is employed, as shown at 80, any suitable side frame members being connected by a transverse arcuate connection 81 and a transverse tubular connection 82. 83 is any suitable transverse shaft mounted in the side frame members of the base 80 in any suitable bearing members not herein shown in detail, and 84 illustrates any suitable driving connection such as a pulley, whereby the shaft 83 may be rotated.

85 indicates an eccentric portion of the shaft 83 which is surrounded by a sleeve 86 provided with any suitable bearing liner 87.

The member 86 forms part of the jaw structure, including a box structure 88 having an upper bearing sleeve 89 with its bearing liner 90 and a front portion 91 open as at 92 for a purpose which will later appear. The jaw structure thus formed oscillates in response to rotation of the shaft 83.

An opposite jaw structure, which is simultaneously oscillated, includes a bottom member 93, a forward or jaw receiving plate 94, an upper transverse member 95, and any suitable side members or webs 96. 97 is any suitable abutment or platform for the lower end of the coil spring 98, the purpose of which will later appear. 99 indicates a shaft eccentrically mounted in a disc 100 which is secured for rotary adjustment in a split bearing portion 80a of the base 80. It will be understood that the eccentrically mounted shaft 99 may be set in any desired position in relation to the center 101 of the split bearing portion 80. The shaft 99, with its center 102, provides a pivot about which under certain circumstances the element 103 may rotate. 104 is a pin interposed between the members 103 and 93 which serves to permit relative movement of the two.

The member 103 is provided with an extension 105 which engages a lower portion of the member 93 as at 106 when the parts are in the position shown in Fig. 7. It also serves to permit the passage of a pin 107 which has a head 108 engaging a lower portion of the member 105, the opposed faces being generally arcuate. It will be understood that the member 108 may consist of a bar and any desired number of pins 107 may be employed. Each such pin extends upwardly not only through the member 105 but through an aperture 110 in the member 93 which is of sufficient size to give a change in the relationship of the various parts described. The pin further extends upwardly through the spring 98 and is provided with an upper spring compressing abutment 111, the position of which may be adjusted for example by the adjusting nut 112 screw-threaded to the upper end of the pin. Thus the compression may be adjusted to hold the parts in position.

It will be understood that in effect I provide two jaw structures each of which is mounted at its lower end on a shaft passing through or mounted on the base 80. Of these shafts, the shaft 99 is normally fixed while the shaft 83 is rotated to oscillate both jaws. The oscillation of the first jaw imparts oscillation to the second jaw, for example through a pivotal connection at the upper end of the two jaw structures which includes a shaft 113 which passes through the sleeve 90 and is mounted in any suitable fashion in the side plates or webs 96.

Mounted on the transverse member 95 and suitably secured to the side plates 96 is any suitable feed spout structure having a bottom member 114 and an arcuate upper member 115 which surrounds and protects the sleeve 89. Any suitable side plates 116 close the feed spout structure. It will be understood that the spout structure oscillates with the jaw upon which it is mounted and serves as a feeding and a feed limiting device. The angle of the member 114 may be such as to provide any desired speed of feed in response to the normal oscillation of the jaws.

Any suitable removable jaw plates may be mounted on the jaw structures. I illustrate for example plates 120 and 121, each of which has a generally centrally located rearward extension having a lower inclined portion 122 and an upper inclined portion 123. The portion 122 engages a conforming face 124 formed in the jaw structures. The upper member 123 is gripped by a hook or dog 125 which is pivoted as at 126 to a cross shaft and is operated in a sense as a bell crank by an arm 127 through which passes any suitable securing bolt 128 or, in the case of one of the jaws, is provided with an adjusting set screw 129. In any event, there is a positive jaw or gripping action whereby each plate is firmly held in position with its upper and lower edges free and its center gripped.

It will be noted that the plate 120 is slightly convex whereas the plate 121 is concave. It will be understood of course that any desired form or contour of plate may be employed, but the contours shown I find to be satisfactory. Note that the bottom bases are generally equi-distant at their lower zone of approach. It will be also observed that the jaw plates are reversible, which is of course the case in all the jaw plates shown in the forms of the device herein described and illustrated.

Figure 9:
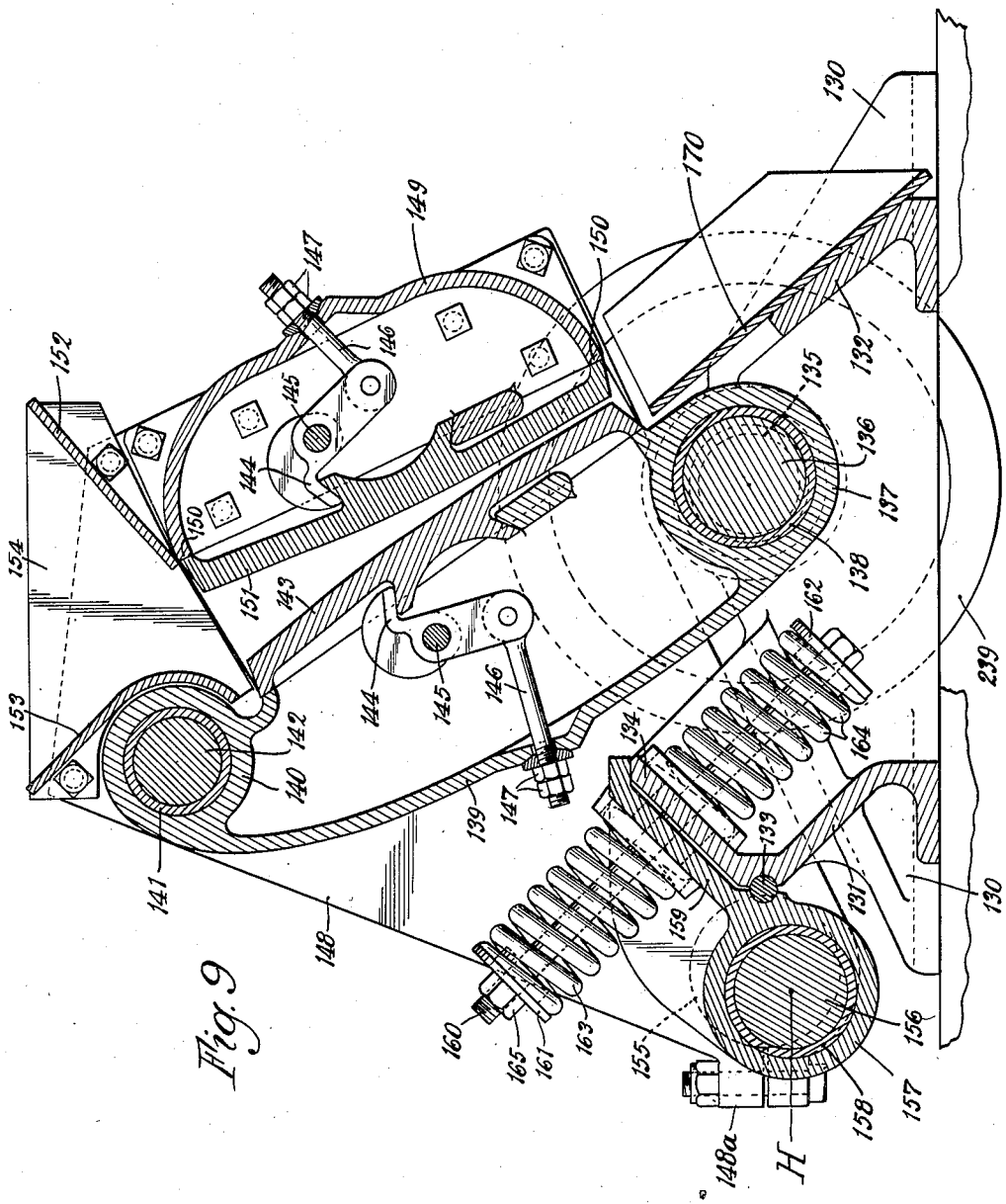
Fig. 9 is a similar section through a further variation of my device.

Referring to the form of Figs. 9 and 10, I illustrate a base portion generally as 130. It has transversely extending frame members 131 and 132. The member 131 includes a forward portion apertured to receive a pivot pin 133 and an upwardly and rearwardly inclined portion 134. A shaft 135 is rotatably mounted in the base 130 and includes an eccentric portion 136 surrounded by a jaw sleeve 137 with its bearing liner 138. 239 indicates a pulley or other suitable driving means whereby the shaft 135 is rotated and its eccentric portion 136 thereby imparts oscillation to the jaw structure.

The jaw structure includes a box portion generally indicated as 139 which includes also an upper sleeve 140 with its liner 141 which surrounds a shaft 142, mounted on the opposite jaw structure which is below described. 143 is a jaw plate closing the front of the box 139 and secured in position by means similar to those shown in Fig. 7, the hook 144 being pivoted about a center 145 and being rotated about such center by any suitable tension rod 146 with its nuts 147.

The opposite jaw structure includes any suitable side plates 148 and a connecting box structure 149, having for example forward edges 150 to receive the free edges of the jaw plate 151 formed similarly to the plate 120 of Fig. 7 and secured by a hook 144 substantially like the hook holding the jaw plate 143. Mounted on the side plates 148 and above the box 149 is any suitable feed spout including a lower spout wall 152, an opposite wall 153, and side walls 154. It will be understood that this feed spout oscillates with the jaw structure. Mounted in split bearings 148a, integral with the side plates 148, are discs 155 which carry an eccentric portion 156, similar to the structure including the shaft 99 and disc 100 of Figs. 7 and 8, which is surrounded by a sleeve 157. 158 indicates a wearing liner. Associated with the sleeve 157 is an outwardly extending portion 159 conforming generally to the frame portion 134. The sleeve 157 also engages the pivot pin 133, as shown in Fig. 9.

160 indicates a pin passing through the members 134 and 159 and provided at each end with spring abutments 161, 162. 163 indicates a coil spring compressed between the member 161 and the member 159. 164 indicates a spring compressed between the member 162 and the member 134. 165 is any suitable nut screw-threaded on the pin 160 and adapted to vary the compression on the springs. It will be understood that the springs 163 and 164 normally hold the parts in the position shown in Figure 9, but that an excess crushing strain in the crushing cavity between the plates 143 and 151 will cause the member 159 to take a counter-clockwise rotation about the center defined by the pin 133, which permits a recession of the plate 151 from the plate 143 as shown in Figure 10.

170 indicates a discharge chute which may be supported upon the cross member 132.

It will be understood that I may employ any suitable feed controlling means for controlling material fed to the crushing cavity. I illustrate, for example, in Fig. 1, a conveyor belt, which may be taken as diagrammatically representative of any suitable feeding means. I illustrate a belt 200 passing about any suitable sprocket 201, the driving means for the belt not being herein indicated. Material from any suitable source is delivered to the belt 200, and as the belt passes about the sprocket 201 the material to be crushed is thrown upon the spout member 62, and thence passes to the crushing cavity.

Whereas I have shown a conveyor belt, it will be understood that any other suitable feeding means, such as an apron feeder or a swinging feeder, may be employed. It will be further understood that, whereas I have shown such a feeding means only in connection with Fig. 1, the other drawings, such as Figs. 9 and 10, are to be read as if including any such suitable feeding means. While such feeding means is not in all circumstances necessary, it may be valuable as providing a controlled feed, and as preventing over-feeding of the crushing cavity.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my crushing method and apparatus are as follows:

I illustrate two jaw assemblies A and B, both of which are oscillated in unison in response to the rotation of the shaft 13. The two jaw structures are pivoted to each other for rotation about the center C, as shown for example in Fig. 4, defined by the axes of the stub shafts 23. The stub shafts terminate short of the crushing cavity so that the feed structure formed by the members 62, 63 and 65 feeds material directly downwardly between the opposed jaw liners 66 and 67. As the shaft 13 is rotated, it imparts an oscillation to the jaw structure A which in turn, through the pivotal connection C, is imparted to the jaw structure B.

In operation, the result of the rotation of the shaft 13 is to cause the liners 66 and 67 to move toward each other and downwardly, thus simultaneously gripping the material in a crushing grip and conveying it downwardly through the crushing cavity. Thereafter, as the rotation continues, the downward movement of the two jaws continues but they begin to separate. This releases the crushed material while the jaws are still moving downwardly, and leaves it with a downward impetus which speeds its travel through the crushing cavity. The effect of gravity increases the speed of movement of the particles until they are again gripped. However, when gripped, they are gripped by the jaws which have already begun downwardly to converge and instead of being stopped by seizure between members which move only laterally, stoppage is reduced or eliminated by the fact that they are seized between downwardly moving jaw members.

Thus at each crushing nip the material is conveyed downwardly through the crushing zone as well as crushed, and the result is a speeding up of the material to a speed of feed and crushing passage far greater than that which can be obtained by relying upon gravity alone in a machine where particles are all stopped at each crushing nip.

Figure 5:
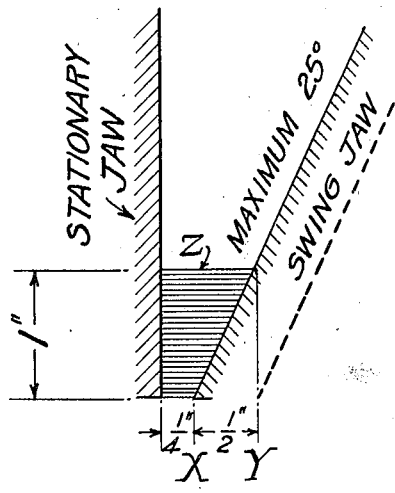
Fig. 5 is a diagrammatic illustration of the action of a conventional prior art jaw crusher.
Figure 6:
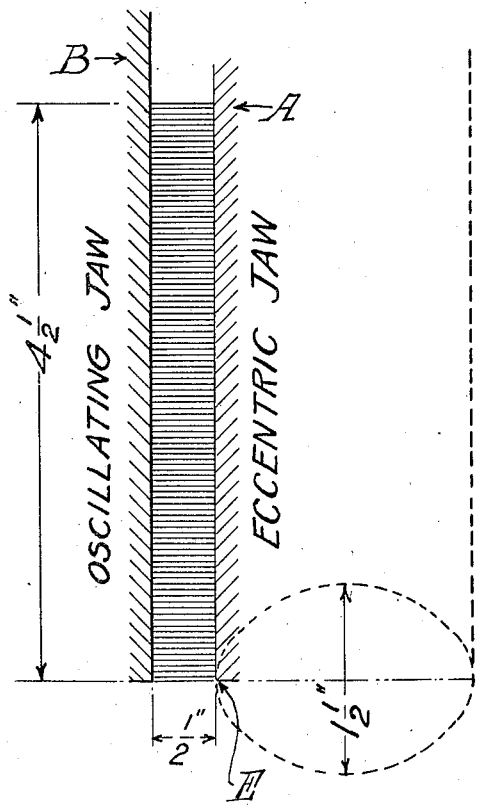
Fig. 6 is a diagrammatic view of the action of the crusher of my invention.

In considering the mode of the crushing operation, consider first Figs. 5 and 6, Fig. 5 representing the conventional jaw crusher with a stationary jaw and a swinging jaw, and Fig. 6 indicating the action of my structures A and B, which may be described as the eccentric jaw and the oscillating jaw, respectively.

Referring to Fig. 5, ordinarily a swing jaw is moved to and from a stationary jaw. The amount of motion is necessarily limited by the allowable compression at one stroke. A one-half inch throw, in this type of jaw crusher, is a tremendously large jaw movement. If it is assumed that the crusher diagrammatically shown in Fig. 5 is set to a quarter inch closest opening, with a half-inch throw of the jaw, the jaw will move from the position X to Y and back again at one revolution of the shaft 13, and it could only discharge the shaded wedge of material because anything above the line Z would be larger than three-quarter inch and could not get through the maximum opening without being again crushed. Thus in the conventional jaw crusher, the area of the wedge of material discharged in one revolution could not exceed that shown in Fig. 5, which under these conditions would be .5 square inch.

Referring to Fig. 6, if the jaws A and B are set one-half inch apart in their closest approach, the result would be the mean size of product of the conventional jaw shown in Fig. 5. If we consider that the point E, at the bottom of the moving jaw, moves in an elipse in response to the movement of the shaft 13, with a short axis of one and one-half inches, at each revolution it will be moving at least four and one-half inches. When the material is released, the material will also be moving at the same rate as the point E on the jaw, and would move four and one-half inches for each revolution of the point E. In other words, if gravity is neglected, the crusher will discharge a four and one-half inch strip of material at every revolution. At a one-half inch setting, the area of the material discharged will be 2.25 square inches.

Comparing the conventional crusher of Fig. 5 with my crusher of Fig. 6, I have several times the discharge area of the conventional crusher and this means several times the capacity for any given width of machine. In this computation, I have neglected the force of gravity which will also increase the downward travel of the material and thus the capacity of the machine.

As to the mechanics of the crusher, the eccentric jaw 67 is pivoted to the oscillated jaw 66 as at C, and the jaw 66 in turn pivots or oscillates about the point F. An analysis of the action shows that while the motion of the jaw plates themselves is approximately straight toward and from each other, which avoids abrasion, they are also both carried up and down in an arc about the central point G as the eccentric shaft 13 is rotated. Any jaw crusher will crush more than enough material, at the top of the crushing zone, to flood the bottom of the crushing zone, and the capacity of the jaw crusher is restricted to what the bottom zone will discharge.

In designing my crusher, I have shaped the jaws in such a manner that there can never be a reduction of more than two to one. This means that if the crusher is set to one-half inch, as shown in Fig. 6, it will return to within one inch before any crushing is done, and two-thirds at least of the travel of the jaws toward each other will have been made before any crushing takes place. From this results that the crushing will be done on the downward stroke of the eccentric and that the material will be released at approximately the half-way point of the downward stroke, at which point it has its maximum velocity. This is the logical place to release the material after crushing, for the greatest capacity.

Broadly stated, my method may be described as providing a crushing cavity the sides of which carry the material downwardly toward the discharge end of the crushing zone, as the material is being crushed, the material being discharged with a forward impetus, the sides of the crushing cavity opening free of the material on their return motion toward the feed end for the ensuing crushing, conveying nip.

I provide an efficient release means for the crusher, as shown for example in Fig. 4, it being understood that in response to any excess crushing thrust the jaw structure B recedes from the jaw structure A in response to the pivotal movement of the sleeve 42 about the pivot rod 48. The springs 53 normally hold the parts in the position in which they are shown in Fig. 1, with the member 45 abutting against the end frame member 5. Fig. 4 illustrates the result of an excess crushing thrust, with the member 44 pivoted about the center of the pivot pin 48 and permitting a recession of the jaw structure B.

It will be also understood that the jaw structure B may be adjusted toward and away from the jaw structure A by releasing the split sleeve structure 32 and rotating the sleeves 37 therewithin.

The forms of Figs. 7 and 9 depart substantially in detail from the above described form of Fig. 1 and following, but the operation is broadly the same. Referring for example to Fig. 7, the spring release including the spring 98 is normally sufficiently strong to hold what I may call the toggle structure in the position shown. If non-crushable material enters the crushing cavity, the point defined by the pin 104 will be forced downwardly in an arc around the center 102, which will allow the eccentric 85 to move its full throw even with the crushing cavity jammed, without any breakage. Wear is taken or the crushing cavity adjusted by rotating the eccentric 100, thereby throwing the point 102 toward or away from the center of the axis of the shaft 83.

Referring to the form of Fig. 9, the jaw 151 is permitted to recede from the opposed jaw 143, in response to an excess crushing stress, by a counterclockwise movement of the member 159 about the pin 133. The adjustment for wear may be obtained by rotating the eccentric 155 which will move the center H toward or away from the axis of the shaft 135. It will be observed also that the eccentric jaw, the jaw which is directly rotated, is placed next to the pivot.

I claim:

1. In a jaw crusher, a base, a jaw mounted on said base, and a supporting and driving connection between said jaw and said base, including an eccentric member mounted on said base and means for rotating it, a sleeve on said jaw surrounding said eccentric member, an opposite jaw pivoted directly to said first mentioned jaw at an upper portion of each of said jaws, said pivotal connection being floating and independent of the base, and movable in relation to the base, said jaws together defining a crushing cavity, and an additional pivotal connection between said last mentioned jaw and said base.

2. In a jaw crusher, a base, a jaw mounted on said base, and a supporting and driving connection between said jaw and said base, including an eccentric member mounted on said base and means for rotating it, a sleeve on said jaw surrounding said eccentric member, an opposite jaw pivoted directly to said first mentioned jaw at an upper portion of each of said jaws, said pivotal connection being floating and independent of the base, and movable in relation to the base, said jaws together defining a crushing cavity, and an additional pivotal connection between said last mentioned jaw and said base, the pivotal connection between the two jaws being substantially higher than the connection between the individual jaws and the base.

3. In a jaw crusher, a base, a jaw mounted on said base, and a supporting and driving connection between said jaw and said base, including an eccentric member mounted on said base and means for rotating it about an axis adjacent the bottom of the jaw, a sleeve on said jaw surrounding said eccentric member, an opposite jaw pivoted directly to said first mentioned jaw at an upper portion of each of said jaws, said pivotal connection being floating and independent of and movable in relation to the base, and an additional pivotal connection between said last mentioned jaw and said base.

4. In a jaw crusher, a base, a jaw mounted on said base, and a supporting and driving connection between said jaw and said base, including an eccentric member mounted on said base and means for rotating it, a sleeve on said jaw surrounding said eccentric member, an opposite jaw directly pivoted to said first mentioned jaw at an upper portion of each of said jaws, said pivotal connection being floating and independent of and movable in relation to the base, an additional pivotal connection between said last mentioned jaw and said base, and means for varying the distance between said additional pivotal connection and the crushing face of said last mentioned jaw, including an eccentric mounted on the jaw, a sleeve, associated with said jaw, surrounding it, and means for locking said sleeve against rotation in relation to said eccentric.

5. In a jaw crusher, a base, a pair of opposed jaws mounted on said base and together forming a crushing cavity, said jaws being pivoted together for relative rotation about a common floating axis, located adjacent the top of the crushing cavity, a normally fixed pivotal connection between one of said jaws and said base, and a pivotal connection between the opposite jaw and the base, said last mentioned pivotal connection including an eccentric and means for rotating it, said pivotal connections being at opposite sides of the crushing cavity.

6. In a jaw crusher, a base, a pair of opposed jaws mounted on said base and together forming a crushing cavity, said jaws being pivoted together for relative rotation about a common floating axis, located adjacent the top of the crushing cavity, a normally fixed pivotal connection between one of said jaws and said base, and a pivotal connection between the opposite jaw and the base, said last mentioned pivotal connection including an eccentric and means for rotating it, said pivotal connections being at opposite sides of the crushing cavity, and means for adjusting said normally fixed pivotal connection toward and away from said crushing cavity, and yielding means for holding said normally fixed pivotal connection fixed, said yielding means being adapted to permit movement of said pivotal connection in response to a predetermined excess crushing pressure.

7. In a jaw crusher, a base, a pair of opposed jaws mounted on said base and together forming a crushing cavity, said jaws being pivoted together for relative rotation about a common floating axis, located adjacent the top of the crushing cavity, a normally fixed pivotal connection between one of said jaws and said base, and a pivotal connection between the opposite jaw and the base, said last mentioned pivotal connection including a shaft mounted upon said frame members, and means for rotating it, an eccentric upon said shaft, and a circumferential sleeve associated with said last mentioned jaw and surrounding said eccentric.

8. In a jaw crusher, a base, a pair of opposed jaws mounted on said base and together forming a crushing cavity, said jaws being pivoted together for relative rotation about a common floating axis, located at a level above and adjacent the top of the crushing cavity, a normally fixed pivotal connection between one of said jaws and said base, and a pivotal connection between the opposite jaw and the base, said last mentioned pivotal connection including an eccentric and means for rotating it, said pivotal connections being at opposite sides of the crushing cavity.

9. In a jaw crusher, a base, a pair of opposed jaws mounted on said base and together forming a crushing cavity, said jaws being pivoted together for relative rotation about a common floating axis, located at a level above and adjacent the top of the crushing cavity, a normally fixed pivotal connection between one of said jaws and said base, and a pivotal connection between the opposite jaw and the base, said last mentioned pivotal connection including an eccentric and means for rotating it, said pivotal connections being at opposite sides of the crushing cavity.

10. In a jaw crusher, a base, side frame members upstanding from said base, a jaw, a normally fixed pivotal connection between said jaw and said base, said pivotal connection being located substantially to the rear of the jaw, a second jaw defining with the first jaw a crushing cavity, a direct floating pivotal connection between said first and said second jaws located above the crushing cavity defined by the opposed two jaws the jaws being directly pivoted to each other, and means for imparting movement to said second jaw and, thereby, to said first jaw, including a rotary actuating connection between said second jaw and said base, said connection including an eccentric on said base, and means for rotating it, and a bearing connection between said eccentric and said jaw.

11. In a jaw crusher, a base, side frame members upstanding from said base, a jaw, a normally fixed pivotal connection between said jaw and said base, said pivotal connection being positioned to the rear of the crushing surface of said jaw a distance of the general order of the height of the jaw, a second jaw defining with the first jaw a crushing cavity, a direct floating pivotal connection between the upper ends of said first and said second jaws located above the crushing cavity defined by the opposed two jaws, the jaws being directly pivoted to each other, a rotary connection between said second jaw and said base, and means for imparting movement to said second jaw, and, thereby, to said first jaw.

12. In a jaw crusher, a base, a jaw pivotally mounted on said base, the axis of said pivot being positioned to the rear of the crushing surface of said jaw, by a distance of the general order of the height of the jaw, a second jaw defining with the first jaw a crushing cavity, a floating pivotal connection between the upper ends of said two jaws located above the crushing cavity defined by the opposed two jaws, the jaws being directly pivoted to each other, a rotary connection between said second jaw and said base, and means for imparting movement to said second jaw, and, thereby, to said first jaw.

13. In a jaw crusher, a base, side frame members upstanding from said base, a jaw, a normally fixed pivotal connection between said jaw and said base, said pivotal connection being positioned to the rear of the crushing surface of said jaw a distance of the general order of the height of the jaw, a second jaw defining with the first jaw a crushing cavity, a direct floating pivotal connection between the upper ends of said first and said second jaws located above the crushing cavity defined by the opposed two jaws the jaws being directly pivoted to each other, a rotary connection between said second jaw and said base, and means for imparting movement to said second jaw, and, thereby, to said first jaw, said rotary connection being located adjacent the level of the bottom of the crushing cavity.

14. In a jaw crusher, a base, a jaw pivotally mounted on said base, the axis of said pivot being positioned to the rear of the crushing surface of said jaw, by a distance of the general order of the height of the jaw, a second jaw defining with the first jaw a crushing cavity, a floating pivotal connection between the upper ends of said two jaws located above the crushing cavity defined by the opposed two jaws the jaws being directly pivoted to each other, a rotary connection between said second jaw and said base, and means for imparting movement to said second jaw and, thereby, to said first jaw, said rotary connection being located adjacent the level of the bottom of the crushing cavity.

15. In a jaw crusher, a base, a jaw pivotally mounted on said base, the axis of said pivot being positioned substantially to the rear of the crushing surface of the jaw, a second jaw defining with the first jaw a crushing cavity, a direct floating pivotal connection between the upper ends of the two jaws located adjacent the top of the crushing cavity defined by the opposed two jaws the jaws being directly pivoted to each other, and an actuating connection between said second jaw and said base, including a rotatably mounted eccentric located at a level adjacent the bottom of the crushing cavity.

16. In a jaw crusher, a base, a jaw mounted on said base for rotation about a normally fixed pivot located substantially to the rear of the crushing face of the jaw, a second jaw defining with the first jaw a crushing cavity, a direct floating pivotal connection between the upper ends of the two jaws located adjacent the top of the crushing cavity defined by the two jaws the jaws being directly pivoted to each other, an actuating connection between the second jaw and the base, including a rotatably mounted eccentric located at a level adjacent the bottom of the crushing cavity, and means for rotating said eccentric and for thereby imparting movement to said jaws.

17. In a jaw crusher, a base, a jaw mounted on said base for rotation about a normally fixed pivot located substantially to the rear of the crushing face of the jaw, a second jaw defining with the first jaw a crushing cavity, a direct floating pivotal connection between the upper ends of the two jaws located adjacent the top of the crushing cavity defined by the two jaws the jaws being directly pivoted to each other, an actuating connection between the second jaw and the base, including a rotatably mounted eccentric located at a level adjacent the bottom of the crushing cavity, and means for rotating said eccentric and for thereby imparting movement to said jaws, the pivotal connection between the first jaw and the base and between the two jaws defining, with the axis of said eccentric, a triangle within which the crushing cavity is at all times substantially completely enclosed.

18. In a jaw crusher, a base, a jaw mounted on said base for rotation about a normally fixed pivot located substantially to the rear of the crushing face of the jaw, a second jaw defining with the first jaw a crushing cavity, a direct floating pivotal connection between the upper ends of the two jaws located adjacent the top of the crushing cavity defined by the two jaws the jaws being directly pivoted to each other, and means for moving said second jaw forwardly and downwardly toward the first jaw and for thereby moving the two jaws simultaneously downwardly together during the crushing stroke.

19. In a jaw crusher, a base, a pair of opposed crushing jaws defining between them a crushing cavity, a normally fixed pivotal connection between one of said jaws and the base, such connection being located substantially to the rear of its crushing face by a distance of the general order of the vertical extension of the crushing cavity, an eccentric connection between the lower end of the opposite jaw and the base, and means for rotating said eccentric connection and for thereby imparting movement to said jaw toward and away from said first mentioned jaw, and a direct floating single axis pivotal connection between the upper ends of the jaws, independent of the base and free to move in relation thereto.

20. In a jaw crusher, a base, a pair of opposed crushing jaws defining between them a crushing cavity, a normally fixed pivotal connection between one of said jaws and the base, such connection being located substantially to the rear of its crushing face by a distance of the general order of the vertical extension of the crushing cavity, an eccentric connection between the lower end of the opposite jaw and the base, and means for rotating said eccentric connection and for thereby imparting movement to said jaw toward and away from said first mentioned jaw, and a direct floating single axis pivotal connection between the upper ends of the jaws, independent of the base and free to move in relation thereto, the axis of said last mentioned pivotal connection being above and in vertical alignment with the crushing cavity.

21. In a jaw crusher, a base, a pair of opposed crushing jaws defining between them a crushing cavity, a normally fixed pivotal connection between one of said jaws and the base, such connection being located substantially to the rear of its crushing face by a distance of the general order of the vertical extension of the crushing cavity, an eccentric connection between the lower end of the opposite jaw and the base, and means for rotating said eccentric connection and for thereby imparting movement to said jaw toward and away from said first mentioned jaw, and a direct floating single axis pivotal connection between the upper ends of the jaws, independent of the base and free to move in relation thereto, said jaws being supported solely by their pivotal connections with the base.

22. In a jaw crusher, a pair of opposed crushing jaws defining a crushing cavity, a base on which said jaws are mounted, pivotal connections between the jaws and the base, one for each jaw, located at opposite sides of the crushing cavity defined between the jaws, a direct floating single axis pivotal connection between upper portions of said jaws, said connection being substantially higher than the connections between the jaws and the base, and independent of the base and free to move in relation to the base, and means for imparting a crushing movement to said jaws, said jaws being solely supported by said pivotal connections, the connection between the jaws including a plurality of coaxial shafts located at opposite sides of and out of vertical alignment with the crushing cavity, their axis being above and in vertical alignment with the crushing cavity.

23. In a jaw crusher, a pair of opposed crushing jaws defining a crushing cavity, a base on which said jaws are mounted, pivotal connections between the jaws and the base, one for each jaw, located at opposite sides of the crushing cavity defined between the jaws, a direct floating pivotal connection between upper portions of said jaws, said connection being substantially higher than the connections between the jaws and the base, and independent of the base and free to move in relation to the base, and means for imparting a crushing movement to said jaws, said jaws being solely supported by said pivotal connections, the connection between the jaws including a plurality of coaxial shafts located at opposite sides of and out of vertical alignment with the crushing cavity, their axis being in vertical alignment with the crushing cavity.

24. In a jaw crusher, a base, a pair of opposed crushing jaws defining between them a crushing cavity, a normally fixed pivotal connection between one of said jaws and the base, such connection being located substantially to the rear of its crushing face, an eccentric connection between a lower portion of the opposite jaw and the base, means for rotating said eccentric connection and for thereby imparting movement to said jaw toward and away from said first mentioned jaw, and means for transmitting motion from said last mentioned to said first mentioned jaw, including a direct floating single axis pivotal connection between the upper ends of the jaws, independent of the base, and free to move in relation thereto, the axis of said floating connection being above and in general vertical alignment with the crushing cavity.

25. In a jaw crusher, a pair of opposed crushing jaws defining a crushing cavity, a base on which said jaws are mounted, separate pivotal connections between each jaw and the base, a direct floating single axis pivotal connection between the upper portions of the jaws, said connection being located at a higher level than the connections between the jaws and the base, and above and in vertical alignment with the crushing cavity, said direct floating connection being free to move in relation to the base, and means for imparting a crushing movement to one jaw, and through said floating connection, to the other jaw, said jaws being supported by said pivotal connections.

EDGAR B. SYMONS.